April 7, 1925.  L. W. BUGBEE  1,532,878
LENS PROTRACTOR
Filed July 12, 1923
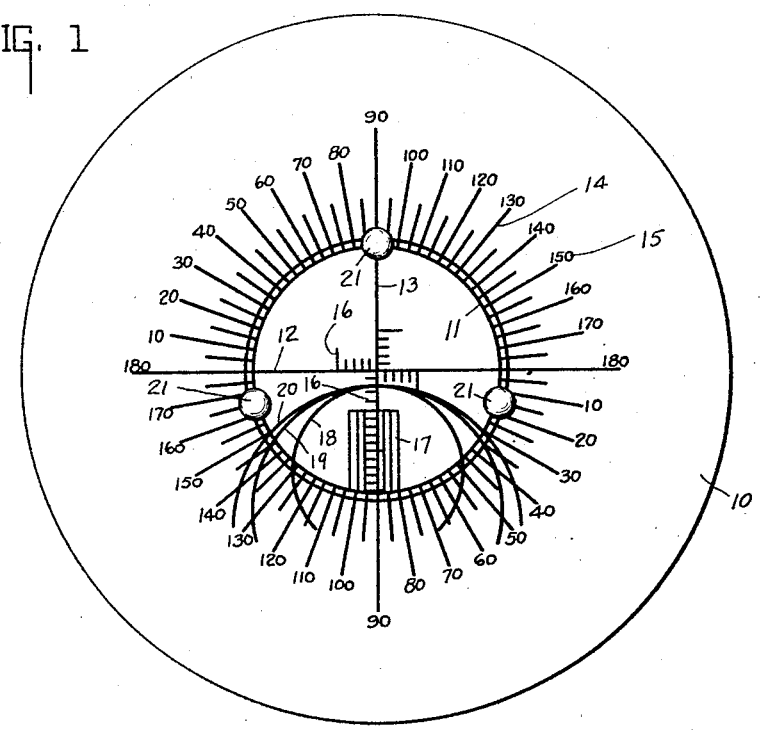
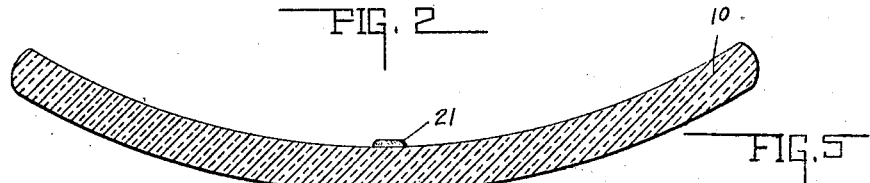
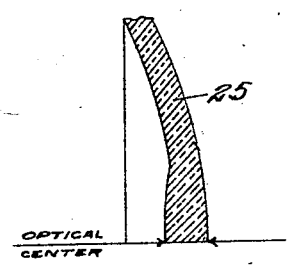 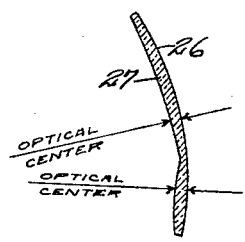 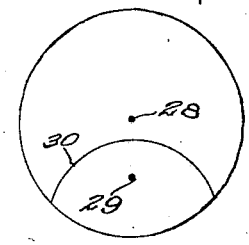
INVENTOR.
LUCIAN W. BUGBEE.
BY
ATTORNEYS.

Patented Apr. 7, 1925.

1,532,878

UNITED STATES PATENT OFFICE.

LUCIAN W. BUGBEE, OF INDIANAPOLIS, INDIANA, ASSIGNOR TO ONEPIECE BIFOCAL LENS COMPANY, OF INDIANAPOLIS, INDIANA, A CORPORATION.

LENS PROTRACTOR.

Application filed July 12, 1923. Serial No. 651,075.

*To all whom it may concern:*

Be it known that I, LUCIAN W. BUGBEE, a citizen of the United States, and a resident of Indianapolis, county of Marion, and State of Indiana, have invented a certain new and useful Lens Protractor; and I do hereby declare that the following is a full, clear, and exact description thereof, reference being had to the accompanying drawings, in which like numerals refer to like parts.

The object of this invention is to provide an efficient and satisfactory protractor for use in locating the axes of bifocal lenses, and especially in making one piece bifocal lenses, for centering and decentering the same and locating the meridians of the lens for aid in scientifically finishing the prescription side thereof or the side opposite the bifocal side thereof and for edging and otherwise forming and mounting the lens accurately in the fixed position.

This invention is of special value for use in the proper manufacture and finishing of bifocal lenses, and especially a one piece bifocal lens or lens blank having a division line between the bifocal surfaces. Corresponding division lines are marked on the protractor and the proper location of the lens is determined by the division line. That is, the bifocal lens is placed on the protractor so that the division line of the lens will register with the division line shown in the protractor. The remaining characteristics of the lens are then determined and marked with reference to the reading segment which is enclosed by said division line. This will enable one to properly center or decenter the lens, for aid in finishing properly the prescription side, and in locating the axis of the cylinders by the meridian lines and the corresponding thicknesses of the lens near the edge at several points for the proper edging and mounting of the lens.

Making the protractor of glass or other transparent material, so that light will pass through the protractor such lenses or lens blanks thereon enables one to quickly and accurately locate the lines and numerals of the chart and mark the lens accordingly. With paper chart or other opaque protractor, it is very difficult or impossible to see and locate the division line of the lens and the lines and numerals on the protractor and make the necessary marks on the blank or lens.

The full nature of the invention will be understood from the accompanying drawings and the following description and claims:

In the drawings, Figure 1 is a plan view of the protractor which constitutes this invention. Fig. 2 is a diametrical cross section thereof.

Fig. 3 is a central vertical section through a one piece bifocal lens blank before it is finished on the prescription side. Fig. 4 is a central vertical section through a one-piece bifocal lens after it has been finished on the prescription side, the dotted line indicating the portion of the blank that has been removed in finishing the same. Fig. 5 is a plan view of the bifocal side of the lens.

This protractor is a plate or disk 10 made of glass or other transparent material. Upon one side thereof a chart of lines and numerals are placed, the same as in paper protractors, and these may be such as desired. In the drawings there is indicated a circle 11 concentric of the disk 10 and having the two primary meridian lines 12 and 13 traversing the same. From the circle 11 radial lines 14 are indicated representing various degrees of a circle and these degrees are indicated by the numerals 15, so that each end of the meridian line 12 is marked "180" and each end of the primary meridian line 13 is marked "90".

On each primary meridian line 12 and 13 there is a millimeter scale 16 and the millimeter scale in the lower half extends from the center to the circle 11, and on each side of the meridian line 13 there are parallel millimeter lines 17. There are also three curved lines 18, 19 and 20 below the center, to represent the lines of division of the usual reading fields in bifocal lenses.

In centering a bifocal lens or one piece bifocal lens blank preliminary to finishing the prescription side and edging and finally shaping of the lens, the bifocal lens blank is placed on the protractor so that the division line between the bifocal surfaces will register with one of the curved lines 18, 19 and 20, and then the various centers and other points on the lens blank are marked by ink with a pen in accordance with the lines on the protractor and in the manner hereafter more fully explained.

With the protractor formed of glass or transparent material, the protractor with the lens blank thereon can be held up to the light and thus render it a very easy and quick operation for the workmen to see the division line in the lens and be sure that it registers exactly with the corresponding line on the protractor. Heretofore, as stated above, when opaque protractors have been employed, it has been difficult to see the division line in the lens and place the blank so that the division line of the lens and the corresponding line of the protractor register with each other. This has always caused confusion and often loss of time.

In order to scientifically and properly finish the prescription side of a onepiece bifocal lens, it is necessary to pay attention to the location of the optical centers of the lens and of the two bifocal surfaces and also the proper meridian for the cylinder axis. This is all the more necessary and is rendered additionally difficult by the fact that the reading field of the blank is thicker than the rest of the lens on account of the longer radius of the curvature of the reading field in the usual form of such lenses. Therefore, in locating the optical centers of the lens, it is necessary to keep away from this thickened portion or rather to make proper allowance for it.

As seen in Fig. 3, the optical center is at the lower edge of the blank 25, being the center of the two bifocal surfaces as ground and particularly being at the thickest portion of the lens. After the blank has been finished on the bifocal side, there is no optical center at the lower edge of the finished lens 27, but instead there are two optical centers, one for each field, the upper one for the distance field and the lower one for the reading field. These optical centers are at the thickest portion of each of the two fields and the prescription side should be so surfaced that the optical center of each field will be in line with the usual center of vision through each field so as to make the same comfortable to the eye. Fig. 5 is a plan view of the bifocal side and shows the two optical centers 28 and 29, one above and the other below the division line 30 between the two fields.

The actual process of centering such onepiece bifocal lens is as follows:

The lens blank is located so that the division line between the two bifocal surfaces register with one of the curved lines 18, 19 and 20, the optical center would be at the point where the two primary meridian lines intersect if the major or distance portion of the lens had no power, but the prescription of the lens in which the reading field has some power as indicated in the prescription and the optical center therefore will be on the primary meridian line 13 at a certain number of millimeters above the horizontal primary meridian line 12 according to the power of said distance field and at that point a dot is made on the lens blank which indicates the optical center of the lens when finished if no allowance is made for insetting the reading field. But it is the better practice and is customary for the reading field to be inset and that is determined by the prescription and, therefore, the blank is turned on the protractor so as to bring the center of the reading field a certain number of millimeters to one side of the vertical primary meridian 13. The millimeter lines 17 in the protractor indicate the extent of this insetting of the reading field. Then dots are made on the glass indicating the optical center of the reading field, and the meridian lines so as to indicate the position of the axis of the cylinder, and four dots are placed on the outer portions of the blank about equal distance apart for use in measuring the edge thickness of the lens, these dots being equidistant from the dot marking the required position of the optical center.

After the lens blank has been thus marked with the protractor, it is ground on the prescription side to form the prescription surface and so that the cylinder axis of the lens will be in the proper meridian and so that the thickness of the lens at the diagonally opposite measuring points will be exactly the same and equally spaced from the optical center dot. The four thickness measuring points must be dotted only on the distance field of the blank and never on the reading field as the latter is thicker than the distance field and if any of said thickness measuring dots are placed on it, then the finished lens would be prismatic and the optical center would not be prescribed.

Buttons 21 are secured on the protractor, preferably three equidistant and on the circle 11, upon which to place the lens or lens blank so as to keep it from rubbing and defacing the chart on the glass protractor. These buttons are secured by adhesive material so that they are removable if necessary.

The invention claimed is:

1. A protractor for use in making bifocal lenses formed of transparent material, and chart lines and numerals placed thereon including curved lines adapted to register with the division line between the bifocal surfaces of bifocal lenses or lens blanks.

2. A protractor for use in making bifocal lenses including a glass plate, and chart lines and numerals placed on said plate including equatorial and meridonal primary meridian lines, a circle concentric with their intersection, lines leading from said circle with numerals indicating the degrees of the circle, curved lines below the equatorial meridian lines and curved downward therefrom and bisected by the meridonal line, and millimeter scales adjacent said primary meridian lines, substantially as set forth.

3. A protractor for use in making bifocal lenses including a glass plate, concavo-convex, chart lines and numerals placed thereon, including curved lines adapted to register with the division line between the bifocal surfaces of bifocal lens or lens blanks, and more than two lugs secured on the glass equidistant from each other and the center of the protractor for supporting the lens or lens blank.

In witness whereof, I have hereunto affixed my signature.

LUCIAN W. BUGBEE.